Oct. 3, 1944.  H. G. EASTMAN  2,359,711

EARTH MOVING MECHANISM

Filed July 8, 1941  3 Sheets-Sheet 1

INVENTOR
*Harold G. Eastman*
BY
*Braselton Whitcomb Davies*

Oct. 3, 1944.       H. G. EASTMAN        2,359,711
               EARTH MOVING MECHANISM
           Filed July 8, 1941       3 Sheets-Sheet 2

INVENTOR
Harold G. Eastman
BY
Braselton, Whitcomb Davies

Patented Oct. 3, 1944

2,359,711

UNITED STATES PATENT OFFICE 2,359,711

EARTH-MOVING MECHANISM

Harold G. Eastman, Stamford, Tex., assignor to Melvin R. Bergman, Toledo, Ohio

Application July 8, 1941, Serial No. 401,535

13 Claims. (Cl. 37—114)

This invention relates to a mechanism for terracing or grading earth materials or terrain and more especially to a terracing machine for the fabrication of terraces, roadways and the like.

The invention comprehends the provision of a machine for terracing or grading surfaces employing rotatable means for distributing earth material as it is loosened by plow means.

A further object of the invention is the provision of power driven means for distributing soil or earth materials for grading, terracing and the like which is arranged to be drawn by a tractor or other suitable means of locomotion so that the terracing mechanism is driven by power means independently of the means transporting the terracing mechanism.

Another object of the invention resides in simple and effective means for predetermining the depth that the terracing mechanism is to operate in the soil and to means for easily and quickly varying the speed of the rotary soil distributing means to regulate the character and width of the terrace being formed.

Further objects and advantages are within the scope of this invention such as relate to the arrangement, operation and function of the related elements of the structure, to various details of construction and to combinations of parts, elements per se, and to numerous other features as will be apparent from a consideration of the specification and drawings of a form of the invention, which may be preferred, in which.

Figure 2:
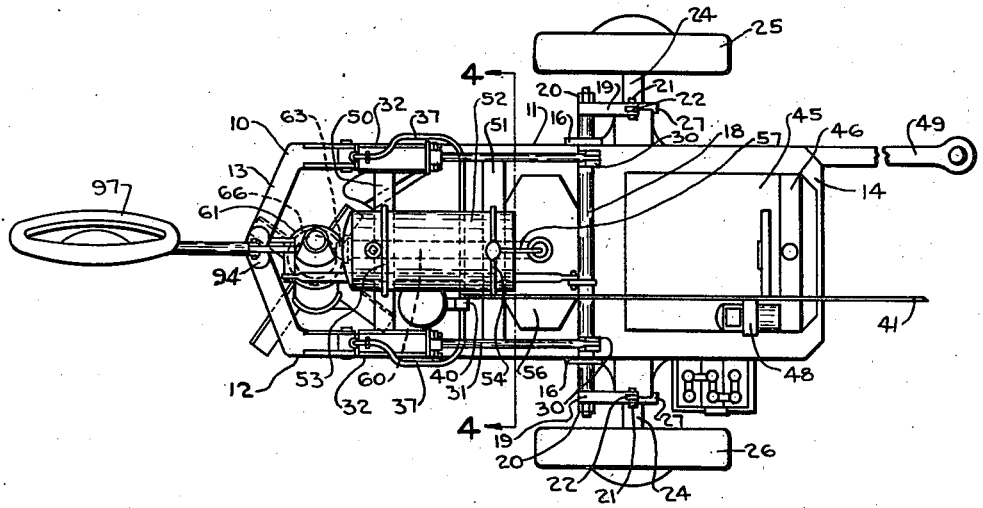
Figure 2 is a top plan view of the machine shown in Figure 1.

While I have illustrated a form of my invention especially designed to produce roadways, terraces and the like, it is to be understood that I contemplate the use of my invention wherever the same may be found to have utility.

Referring to the drawings in detail, the arrangement of my invention is inclusive of a box-like frame 10 formed of parallel side members 11 and 12, a rear cross bar 13 and a forward transversely extending plate 14. Transversely arranged of the frame and journaled in suitable brackets 16 is a shaft 18 provided at its ends with crank members 19, the members 19 being held in place on the shaft by means of nuts 20. The members 19 are pivotally connected by means of stub shafts 21 to vertically extending members 22 which are connected to the spindle elements 24 upon which are journaled the frame supporting wheels 25 and 26, the spindles 24 being carried in suitable guides 27 secured to the vehicle frame 10. Also secured to the transversely extending shaft 18 are upwardly projecting members or cranks 30 to the extremities of which are pivoted rods 31 the latter extending into cylinders 32 arranged adjacent each side of the frame structure 10 of the vehicle, the rods 31 having pistons (not shown) at their extremities contained within the cylinders 32. The pistons secured to rods 31 are adapted to be acted upon by fluid or hydraulic means as for example oil, which is contained in a suitable reservoir 35, the latter being in communication with a pump 36 driven by the internal combustion engine 45 for exerting pressure upon the fluid medium, the pump being in communication with each of the cylinders by means of conduits 37. The flow of the fluid or liquid through the conduits 37 to the cylinders 32 is controlled by means of a valve 40 having an actuating means 41 which terminates at the forward portion of the machine within reach of an operator driving the tractor (not shown) or other means to which the terracing machine may be connected. Valve 40 is so constructed that in one position it permits the fluid pressure set up by the pump 36 to build up in the cylinders 32 against the pistons connected to rods 31 and in another position to release this pressure and permit the return flow of fluid in the cylinders 32 to the reservoir 35. Thus by manipulation of valve 40 through the control means 41, the frame 10 and the mechanism carried thereby may be raised or lowered with respect to the wheels 25 and 26 through the medium of rods 31, cranks or arms 19 and 30 and links 22 which control the position of the wheels 25 and 26 with respect to the frame structure 10. Mounted upon the forward end of frame 10 is the internal combustion engine 45 or other source of power, a radiator 46 containing cooling water or other medium for the engine 45, and a governor 48 of conventional design driven by the internal combustion engine and arranged to regulate and control the speed of said engine. Secured to the forward end of the frame 10 is a draw bar 49 for connecting the terracing machine of my invention to a tractor or other means of locomotion.

The frame structure 10 is provided with transversely arranged members 50 and 51 which form supports for a receptacle 52 containing a supply of fuel for the internal combustion engine 45, the receptacle 52 being secured to the supporting members 50 and 51 by means of straps 53 and 54. Positioned immediately at the rear of the engine 45 is a suitable housing 56 containing a power transmission mechanism embodying suitable gearing for variably changing the ratio of speed of the engine 45 to the centrifugal soil moving means to be hereinafter described. The gear ratios in the transmission may be changed by movement of a gear shifting lever 57.

Figure 1:
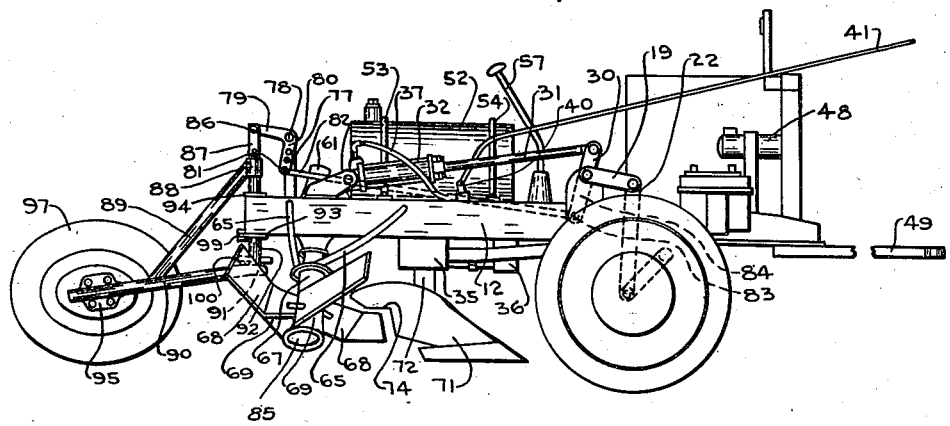
Figure 1 is a side elevational view of the terracing machine of my invention.

Connected to the rear of the transmission housing 56 and arranged beneath the fuel receptacle 52 is a longitudinally extending tubular casing 60 which is also connected to a gear housing 61, the latter enclosing suitable bevel or drive gears for rotating the centrifugal soil moving means. The tubular casing 60 contains a drive shaft 62 which is connected to one of the bevel gears 63 in housing 61. The housing 61 is carried by the frame 10 and reinforced by suitable supporting struts 65 as shown in Figure 1. Housing 61 extends downwardly at an angle with respect to a vertical plane longitudinally of the machine of approximately 33°. Journaled within the housing 61 is a shaft 85 which is driven by means of a bevel gear 66 meshing with the drive gear 63 on shaft 62. Fixedly secured to the lower extremity of the driven shaft 85 is a centrifugal earth materials moving means having a central hub portion 67 to which is fixedly secured a plurality of equally spaced tangentially extending blades or vanes 68, in the embodiment illustrated there being four in number. The connections of blades 68 with the hub portion 67 are reinforced by means of braces 69 so as to lend strength and rigidity to the soil moving means. Arranged at one side of the central plane of the machine is a plow member or cutter 70 which is carried by means of a vertically extending member 72 which is adjustably connected to the frame structure 10 by means of a pair of links 42. Member 72 is connected by means of a link 43 to a manipulating lever 44 supported upon a toothed sector 47 so as to adjust the plow share 71 vertically to determine the plowing depth of the plow structure. The plow member 71 is provided with a mold board 76 so positioned and arranged with respect to the centrifugal soil moving means as to direct the plowed earth material toward the rotating blades 68. The rear portion of the mold board is provided with a notched portion 74 to accommodate the rotatable blades 68 adjacent the plow member.

Figure 3:
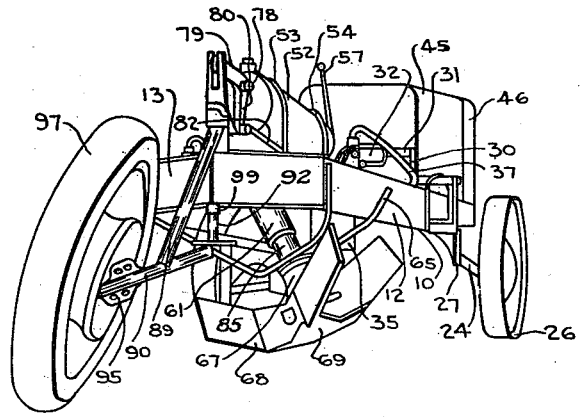
Figure 3 is a rear perspective view of the terracing machine.
Figure 4:
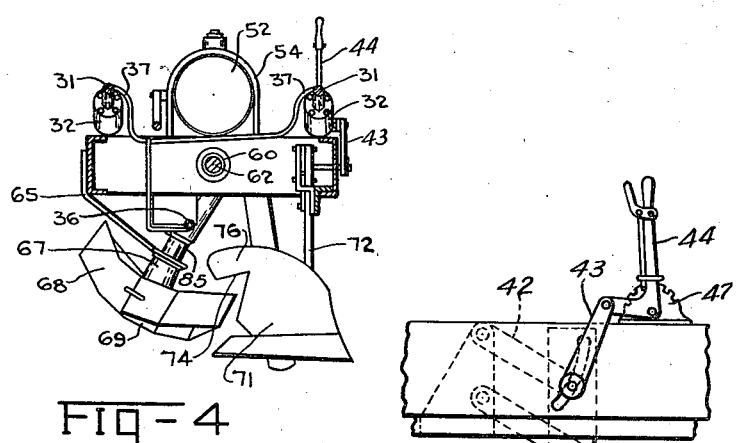
Figure 4 is a sectional view taken substantially on the line 4—4 of Figure 2, showing the plow and centrifugal soil distributing means.

Supported upon and fixedly secured to frame 10 adjacent the rear of the machine is an upwardly projecting bar 77 and pivoted to the upper end of the bar by means of shaft 78 is a bell crank 79, the depending arm 80 of the bell crank being connected by means of a pin 81 with a rod 82, the other end of rod 82 being connected as at 83 with a depending member 84 secured to the transversely extending shaft 18. The rearwardly projecting arm of the bell crank 79 is connected by means of a pin or shaft 86 to a clevis or bracket 87 which is provided at its lower end with a ball thrust bearing 88 contained within a housing 88' which contacts the upper end of a strut 89, the latter being secured to a member 90, the forward ends of strut 89 and member 90 being fixedly connected to a vertically extending shaft 92 passing through openings in brackets 93 and 94 fixedly secured to the upper and lower surfaces of the rear central portion of the frame structure. Secured at the other extremity of bar 90 is a member 95 which is provided with a spindle (not shown) upon which is journaled a third wheel 97, the wheel 97 being arranged at an angle with respect to the vertical plane of the machine as shown in Figure 3 for the purpose of resisting the lateral thrust set up by the centrifugal earth material moving means when in operation.

The structure supporting the wheel 97 is so arranged that when the frame 10 and parts carried thereby are lowered to bring the plow and centrifugal soil moving means into effective operation with earth material, the wheel 97 will be locked in a "straight ahead" position. To this end, there is formed on bracket 93 a lug 99, and the lower end of shaft 92 is provided with a plate 100 having a notch 101 which engages the lug 99 when the frame 10 is in lowered position, and in such position the wheel 97 will be held in "straight ahead" position. When the frame 10 is elevated to lift the plow and centrifugal means above the ground level, that is, the parts being in the position shown in Figure 1, the lug 99 is disengaged from the notch 101 in plate 100, permitting a swinging movement of the rear wheel through the swivel joint 88 so that the machine may be turned.

Figure 5:
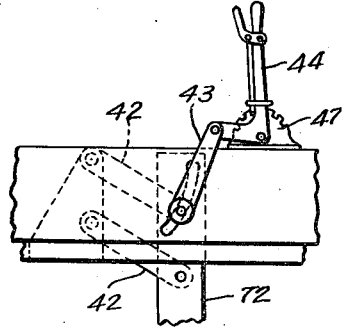
Figure 5 is a fragmentary elevational view illustrating means for adjusting the depth of the plow means.
Figure 6:
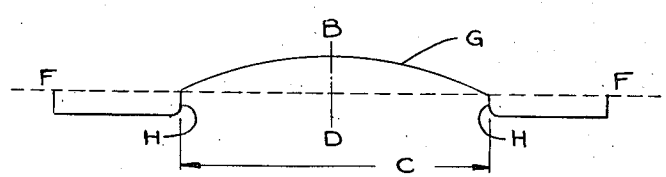
Figure 6 is a diagrammatic view illustrating the formation of a terrace through the use of the machine of my invention.
Figure 7:
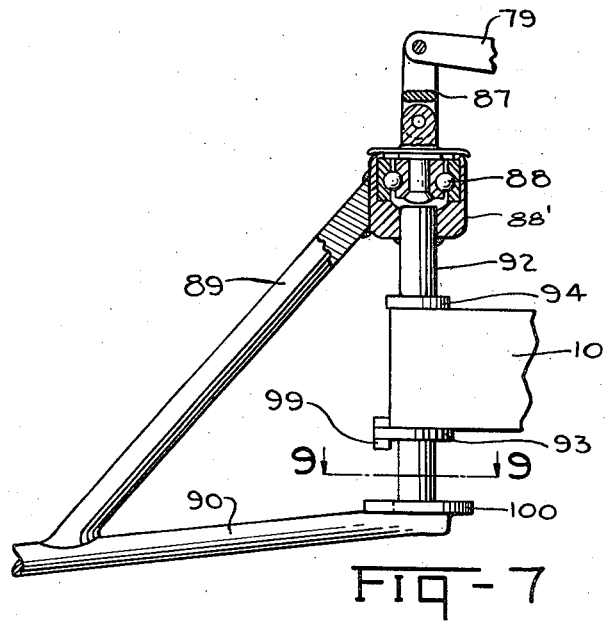
Figure 7 is an enlarged side elevational view partly in section showing the rear wheel supporting frame.
Figure 8:
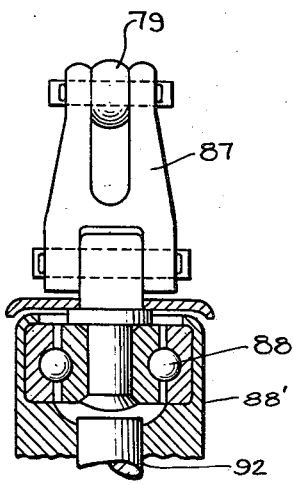
Figure 8 is an enlarged rear elevational view partly in section showing the ball thrust connection for the rear wheel supporting frame.
Figure 9:
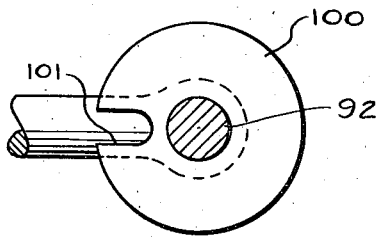
Figure 9 is an enlarged fragmentary sectional view taken on the line 9—9 of Figure 7.

The operation of the terracing machine of my invention is as follows:

When it is desired to place the machine in operation to move earth materials to form a terrace, roadway or berm, the machine is connected by means of the draw bar 49 to a tractor or other suitable means of locomotion. The internal combustion engine 45 is then started in conventional manner and the plow share 71 lowered with respect to the frame 10 of the machine so that the first furrow will be made without utilizing the centrifugal earth moving means 68. Assuming it is desired to produce a terrace of the character shown in Figure 6, the latter figure being a cross-section of a terrace approximately twenty feet wide as indicated by the line C and about twelve inches high at the center. The dotted line F illustrates the original ground line before the terracing machine has been brought into operation, the line G the finished top surface contour of the terrace, and the portion D the original unplowed or unprocessed earth formed centrally and longitudinally of the terrace. As previously stated, the first furrow, when finished being of rectangular locus, is indicated at H. After the machine has plowed the furrow H circumscribing or delineating the central unplowed portion D, the plow 71 is readjusted with respect to frame 10 and the centrifugal means 68 to the relative positions as shown in Figure 1. Upon completion of the first furrow H, the process of terracing by the centrifugal means is then brought into action. The initial position of the machine for the terracing operation is with the thrust wheel 97 in position in furrow H with the plow share 71 adjacent the furrow H in position when lowered to create a second furrow parallel with the initial furrow designated H. In this position of the machine with engine 45 in operation, the valve control 41 is manipulated so as to actuate valve 40 controlling the hydraulic means for raising and lowering the frame 10 and the fluid is permitted to flow out of the cylinders 32 thus moving the links 19, 30 and 84 in a counter-clockwise direction about the axis of shaft 18 to lower the frame 10, the plow share 71 and the centrifugal earth moving means 68 in the following manner: As the link 19 is moved counter-clockwise, the link 22 connected to the means supporting the wheels 25 and 26 elevates wheels 25 and 26 with respect to the frame 10, and, as rod 82 connects arm 84 with the bell crank 80, the latter will be oscillated about a pivot shaft 78, thus also causing the rear end of the frame 10 to be lowered simultaneously with the forward end of the frame. Through this arrangement the frame 10 is maintained substantially in horizontal relation with the ground whether the plow 71 is in engagement with the ground or above the same. After the plow and the centrifugal earth moving means have been thus lowered into contact with the earth, the lever 57 is shifted to secure the desired speed ratio between engine 45 and the centrifugal earth moving means 68 so as to cause rotation of the latter by the engine 45. With the earth moving means rotating, the machine is then caused to move forward being drawn by a tractor or other suitable means (not shown) so that the plow 71 makes a second furrow parallel with and adjacent to the first furrow H away from the unplowed central portion D of the terrace to be formed. As the plow 71 and mouldboard 73 turns the earth in creating a furrow, the vanes 68 of the earth moving means as they rotate adjacent the notch 74 in mouldboard 73 contact with the plowed or disturbed earth material and centrifugally throw the plowed earth in a direction generally transversely of the longitudinal movement of the machine causing the plowed earth to be distributed over the unplowed portion D in the terrace formation. This plowing and distribution of the earth material by the centrifugal means continues furrow after furrow in parallelism with the unplowed section D of the terrace until the ground line of the terrace eventually attains a configuration similar to the line G in Figure 5.

When the centrifugal earth moving means of the terracing means is first brought into operation making the second furrow adjacent the furrow H, the transmission mechanism controlled by lever 57 has a gearing ratio such that the centrifugal earth moving means 68 is rotated comparatively slowly with respect to the speed of the engine 45 as in the first or initial stages or steps in the process of terracing, the earth materials are only distributed over the portions of section D, the unplowed central part of the terrace. As the machine plows furrow after furrow moving farther away from the central axis B, the transmission gear ratio may be changed by movement of shifting lever 57 so that the centrifugal earth moving means 68 runs at a higher speed with respect to the speed of the engine 45 so that the loose earth materials may be thrown farther across the terraced section as the terrace gets wider. By this means the terrace may be given a definite configuration as to width and height by simply regulating the speed of the centrifugal earth moving means as the terrace is being made. After a section of terrace has been completed and it is desired to discontinue the use of the machine, the valve 40 is again actuated through the rod 41 and the fluid or oil from the reservoir 35 pumped by means of pump 36 driven from the engine 45 into cylinders 32 against the pistons therein to rotate the links 19, 30 and 84 and bell crank 80 in a clockwise direction so as to elevate the frame 10, plow 71 and centrifugal earth moving means 68 above the ground line by downward movement of wheels 25, 26 and 97 after which the machine may be moved without the plow or earth moving means engaging in the earth.

It is to be noted that when the frame structure 10, plow 71 and earth moving means 68 are in lowered position the notch 101 in plate 100 engages with the lug or ear 99 holding the wheel 97 in "straight ahead" position to resist the lateral thrust setup by the centrifugal earth moving means. When the direction of the machine is to be changed, the frame 10 and associated parts are elevated in the manner hereinbefore described which disengages lug 99 from plate 100 and permits the wheel 97 to swivel about the axis of the vertically disposed shaft 92, the vertical thrust being taken up upon the ball thrust bearing 88 contained within the member 88'.

It is apparent that, within the scope of the invention, modifications and different arrangements may be made other than is herein disclosed, and the present disclosure is illustrative merely, the invention comprehending all variations thereof.

What I claim is:

1. In a mechanism of the character disclosed, a frame structure; a plurality of wheels supporting said structure; means connecting said wheels and said frame structure whereby the latter may be elevated or lowered with respect to said wheels; means for controlling said frame elevating and lowering means; a plow member carried by said frame; a shaft depending from said frame and rotatably supported thereon; a plurality of blades carried by said shaft, said shaft being arranged at an acute angle with respect to a vertical longitudinal plane through said frame; a source of power; transmission mechanism connecting said source of power with said rotatable shaft; a guide wheel arranged rearwardly of said frame, said wheel being normally arranged at an angle with respect to a vertical plane through the main frame; and means for locking said guide wheel in an aligned position with respect to the frame when the latter is in lowered position.

2. In a mechanism of the character disclosed, a main frame structure; a plurality of wheels supporting said main frame structure; means connecting said wheels and said frame structure whereby the latter may be elevated or lowered with respect to said wheels; means for controlling said frame elevating and lowering means; a plow member carried by said frame and vertically adjustable with respect thereto; a shaft depending from said frame and rotatably supported thereon; a plurality of blades carried by said shaft, said shaft being arranged at an acute angle with respect to a vertical longitudinal plane through said frame; a source of power; transmission mechanism connecting said source of power with said rotatable shaft, said transmission mechanism being capable of changing the speed ratio between said source of power and said shaft; a wheel arranged rearwardly of said frame; a supplemental frame connecting said wheel to said main frame structure, said wheel being normally arranged at an angle with respect to a vertical plane through the main frame; and means for retaining said wheel in an aligned position with respect to the main frame when the latter is in lowered position.

3. In a mechanism of the character disclosed, a main frame structure; a source of power associated with said frame structure; a plurality of wheels supporting said main frame structure; means connecting said wheels and said frame structure whereby the latter may be elevated or lowered with respect to said wheels; controlling means for said frame elevating and lowering means; a plow member carried by said frame structure; a shaft extending substantially longitudinally of said frame and connected to the source of power; a second shaft depending from said frame and arranged at an angle of approximately 33° with respect to a vertical longitudinally extending plane through the frame structure; gearing connecting said shafts; a hub associated with said second shaft; a plurality of flat blades carried by said hub and projecting tangentially therefrom; a supplemental frame including a vertically arranged shaft journaled upon said main frame structure; a wheel journaled upon said supplemental frame; means including a bell crank for changing the relative position of said main frame structure with respect to said supplemental frame; and locking means for retaining the wheel carried by said supplemental frame in aligned position with respect to said main frame structure when the latter is in lowered position.

4. In a mechanism of the character described, in combination, a frame; a plurality of wheels supporting said frame; means connecting said wheels and said frame for elevating and lowering the latter with respect to said wheels; a plow member carried by said frame; a rotatable shaft depending from said frame at an angle of approximately 33° with respect to a vertical longitudinal plane through the mechanism; a hub associated with said shaft; a plurality of blades carried by said hub and disposed substantially tangentially with respect thereto, said blades being arranged with respect to said plow member whereby earth materials are loosened and directed by said plow member into the path of said blades for distributing said loosened earth materials.

5. In a mechanism of the character disclosed, in combination, a main frame; an engine associated with said frame; a shaft journalled upon said frame and extending transversely thereof; supporting wheels for said frame; linkage connecting said supporting wheels with said transverse shaft; a supplemental frame connected to said main frame and arranged for movement relative thereto; a guide wheel carried by said supplemental frame; linkage connecting said supplemental frame to said transverse shaft; a cutter carried by said main frame; a second shaft adapted to be driven by said engine; a hub associated with said driven shaft; a plurality of vanes carried by said hub and arranged substantially tangentially with respect thereto; hydraulically actuated means associated with said transverse shaft for causing relative vertical movement between said wheels and said main frame to establish engagement of the cutter with the material to be cut; and variable speed transmission mechanism connecting said driven shaft and engine for rotating said vanes to effect distribution of material dislodged by said cutter.

6. In combination, a frame structure; a source of power associated with said frame structure; a plurality of supporting wheels; a plow carried by said frame; a depending shaft journalled on said frame and adapted to be driven by said source of power, said shaft being arranged at an acute angle with respect to a vertical longitudinal plane through said frame; earth throwing means including a plurality of vanes associated with said shaft and arranged substantially tangentially with respect thereto; linkage connecting said wheels and said frame; means connected to said linkage for effecting relative movement between said frame and said wheels; and power transmission mechanism connecting said depending shaft to said source of power for rotating said vanes to distribute the loosened earth severed by said plow.

7. In combination, a frame structure; a source of power associated with said frame structure; a plurality of supporting wheels; a plow carried by said frame; a depending shaft journalled on said frame and adapted to be driven by said source of power, said shaft being arranged at an acute angle with respect to a vertical longitudinal plane through said frame; earth throwing means including a plurality of vanes associated with said shaft and arranged substantially tangentially with respect thereto; linkage connecting said wheels and said frame; means connected to said linkage for effecting relative movement between said frame and said wheels; power transmission mechanism connecting said depending shaft to said source of power for rotating said vanes to distribute the loosened earth severed by said plow; and a guide wheel arranged rearwardly of said frame, said guide wheel being normally arranged at an angle with respect to a vertical plane through the frame for resisting the lateral thrust set up by engagement of the rotating vanes with the loosened earth.

8. In combination, a frame; supporting wheels associated with said frame; means interposed between said frame and wheels operable to change their relative position; a plow carried by said frame and adapted for engagement with the ground to be cut; a shaft carried by said frame and disposed at an acute angle with respect to a vertical longitudinal plane through the mechanism; a hub associated with said shaft; a plurality of vanes carried by said hub and disposed substantially tangentially with respect thereto; means for moving said frame with respect to the ground; and a power transmission mechanism for connecting said shaft to a source of power for rotating said vanes to distribute the earth cut by said plow.

9. In combination, a tractable frame structure; a source of power associated with said frame structure; a plow carried by said frame; a rotatable shaft journalled on said frame and adapted to be driven by said source of power, said shaft being arranged at an acute angle with respect to a vertical longitudinal plane through said frame; earth throwing means including a plurality of blades associated with said shaft; and power transmission mechanism connecting said depending shaft to said source of power for rotating said blades to distribute laterally the loosened earth severed by said plow.

10. In combination, a tractable supporting frame structure; a source of power associated with said frame structure; a longitudinally aligned plow carried by said frame having a plowshare; a depending shaft journalled on said frame and adapted to be driven by said source of power, said shaft being arranged at an acute angle extending laterally transversely beyond said plowshare with respect to a vertical longitudinal plane through said frame; earth throwing means including a plurality of separate blades associated with said shaft; and power transmission mechanism connecting said depending shaft to said source of power for rotating said vanes to pulverize and distribute laterally the loosened earth severed by said plow.

11. In combination, a tractable supporting frame; a plow carried by said frame and adapted for engagement with the ground to be cut; a shaft carried by said frame and disposed at an angle with respect to a vertical longitudinal plane through the mechanism; a hub associated with said shaft; a plurality of vanes carried by said hub and disposed substantially tangentially with respect thereto; means for moving said frame with respect to the ground; a power transmission means for connecting said shaft to a source of power for rotating said vanes to distribute the earth cut by said plow, and variable speed mechanism associated with said power transmission means.

12. In a grading machine, in combination, a tractably supported frame structure; a longitudinally aligned plow carried by said frame; a depending shaft journalled on said frame and adapted to be driven to rotate said shaft, said shaft being arranged at an acute angle extending laterally with respect to a vertical longitudinal plane through said frame; earth throwing means including a plurality of separate blades associated with said shaft; and a thrust wheel connected with said frame and inclined with respect thereto at a angle in a direction opposite to the angular location of said depending shaft.

13. In a grading machine, in combination, a tractably supported frame structure; a plow carried by said frame adapted to cut a longitudinal furrow from the earth; a rotatable shaft journalled on said frame and adapted to be rotated, said shaft being arranged at an acute angle with respect to a vertical longitudinal plane through said frame; earth throwing means including a plurality of blades associated with said shaft, said mechanism arranged to distribute laterally the furrow cut by said plow.

HAROLD G. EASTMAN.